US009017496B2

(12) United States Patent
Scapinelli et al.

(10) Patent No.: US 9,017,496 B2
(45) Date of Patent: Apr. 28, 2015

(54) DRUM FOR CUTTING AND TRANSFERRING LINERLESS LABELS FROM A CONTINUOUS STRIP TO A MOVING CONTAINER AND APPARATUS EQUIPPED WITH SAID DRUM

(75) Inventors: Tarcisio Scapinelli, Castellucchio (IT); Andrea Botrini, Castellucchio (IT)

(73) Assignee: ILTI S.r.l., Castellucchio (IT)

( * ) Notice: Subject to any disclaimer, the term of this patent is extended or adjusted under 35 U.S.C. 154(b) by 251 days.

(21) Appl. No.: 13/179,849

(22) Filed: Jul. 11, 2011

(65) Prior Publication Data

US 2012/0175039 A1 Jul. 12, 2012

(30) Foreign Application Priority Data

Jul. 14, 2010 (IT) .............................. MI2010A1293

(51) Int. Cl.

| | |
|---|---|
| ***B32B 41/00*** | (2006.01) |
| ***B65C 9/18*** | (2006.01) |
| ***B26D 1/42*** | (2006.01) |
| *B26D 5/16* | (2006.01) |
| *B26D 7/01* | (2006.01) |

(52) U.S. Cl.

CPC ............ *B65C 9/1807* (2013.01); *Y10T 156/12* (2015.01); *B26D 1/425* (2013.01); *B26D 5/16* (2013.01); *B26D 7/018* (2013.01); *B65C 2009/1838* (2013.01)

(58) Field of Classification Search

CPC .... B65C 9/1803; B65C 9/1826; B65C 1/021; B65C 9/42; B65C 2009/0081; B65C 9/1819; B65C 3/16; B65C 9/28; B65C 2009/0084; B65C 2009/1838; B65C 9/30; B65C 2009/1834; B65C 9/2221

USPC ........... 156/64, 212, 215, 250, 270, 285, 353, 156/354, 355, 556, 566, DIG. 24, DIG. 28, 156/DIG. 33

See application file for complete search history.

(56) References Cited

U.S. PATENT DOCUMENTS

| | | | | |
|---|---|---|---|---|
| 5,776,289 | A | 7/1998 | Steidinger | |
| 6,095,218 | A * | 8/2000 | Delmolino et al. | 156/353 |
| 6,328,832 | B1 * | 12/2001 | Otruba et al. | 156/64 |

FOREIGN PATENT DOCUMENTS

| | | | |
|---|---|---|---|
| DE | 102007058818 | A1 | 6/2009 |
| WO | 0000397 | A2 | 1/2000 |
| WO | 2009030893 | A1 | 3/2009 |

*Primary Examiner* — Michael N Orlando
*Assistant Examiner* — Joshel Rivera
(74) *Attorney, Agent, or Firm* — Mintz Levin Cohn Ferris Glovsky and Popeo, P.C.

(57) ABSTRACT

A drum for cutting linerless labels from a continuous strip and transferring the labels to a container movable with a given trajectory and speed on a machine, the drum including a side surface suitable for guiding the strip by contacting a non-adhesive surface of the labels, the side surface defining a vertical slit, a coaxial and concentric sleeve for centering the drum on a corresponding support spindle, a cutting blade parallel to a vertical direction of the drum, the cutting blade being displaceable in a radial direction from a position retracted inside the drum to a position at least partially extended through the vertical slit outside the side surface of the drum, a fixed cam relative to which the drum rotates and that is configured to press against the cutting blade so as to cause the cutting blade to extend out in a predefined angular position, and a seat that extends in the vertical direction (Z-Z) and is connected to the cam and which is suitable for engagement with a corresponding fixed reference pin in order to determine a predefined angular position of the cam, wherein the drum is configured to retain the strip against the side surface of the drum.

29 Claims, 4 Drawing Sheets

DRUM FOR CUTTING AND TRANSFERRING LINERLESS LABELS FROM A CONTINUOUS STRIP TO A MOVING CONTAINER AND APPARATUS EQUIPPED WITH SAID DRUM

CROSS-REFERENCE TO RELATED ACTIONS

This application claims the benefit of and priority to Italian Patent Application No. MI2010A001293, filed Jul. 14, 2010, which is incorporated by reference herein in its entirety.

BACKGROUND

It is known in the technical sector of packaging that there exists the need to apply onto each product container a corresponding identification label. Also known are apparatus which are able to transfer onto the container individual self-adhesive labels which are mounted on a backing strip and wound on a reel, by means of programmed and controlled unwinding of the said reel and transfer of a label onto the corresponding container which is moving on an associated labeling machine. In this technical sector also well known are so-called "linerless" labels or labels that are not mounted on a backing strip that must be separated from the label when the latter is applied and recovered separately for disposal thereof. These "linerless" labels essentially consist of a single sheet of suitable material, one of the opposite surfaces of which is provided with an adhesive layer for gluing to the container, while the opposite surface is lined with a transparent and non-adhesive varnish designed to prevent adhesion of the continuous strip when wound onto itself. The continuous strip can also be provided with (pre-cut) perforations forming preferential cutting lines suitable for separation of each label from the ones adjacent thereto.

Reference WO 2009/030893 discusses a method and an apparatus for transferring linerless labels to a container moving on a labeling machine along a given path associated with the machine. The apparatus is based on the use of a silicone-lined transfer belt which rotates in a closed loop around two rollers and which conveys the continuous strip of labels in a direction inclined at a suitable angle relative to the plane of displacement of the product onto which the label must be applied. This relative angle essentially allows the label, which advances together with the transfer belt, to come into contact tangentially with the container and, when it adheres by means of contact to the container, to be cut along pre-cut lines by a fixed blade arranged upstream and perpendicular to the belt itself. Although fulfilling its function, this apparatus nevertheless has a number of drawbacks associated mainly with the fact that the labels made of soft and/or thin material tend not to separate from the transfer belt in a reliable and highly repeatable manner, said separation being determined by the radius of curvature of the transfer belt which cannot be reduced beyond a certain limit value.

In addition, it has been found that the surface of the belt, to which the label is attached, tends to become soiled over time, resulting in an unstable relative contact between belt and label. This can cause, at the moment of separation, an incorrect angle with respect to the belt, with the result being that the label is positioned crookedly on the finished product. Moreover, this solution requires that the labels be made of materials that are so rigid that they are unable to follow the small angle of curvature of the drive belt and therefore become separated from it.

The fixed position of the cutting blade moreover has the effect that it is not possible to cut labels with a certain margin of tolerance in terms of their longitudinal dimension. These drawbacks also mean that with the known apparatus it is not possible to reach the high speeds at which the containers travel on most recent labeling machines, said apparatus thus being essentially unsuitable for the present-day production/packaging cycles.

SUMMARY

In general, in an aspect, embodiments of the invention can provide a drum for cutting linerless labels from a continuous strip and transferring the labels to a container movable with a given trajectory and speed on a machine, the drum including a side surface suitable for guiding the strip by contacting a non-adhesive surface of the labels, the side surface defining a vertical slit, a coaxial and concentric sleeve for centering the drum on a corresponding support spindle, a cutting blade parallel to a vertical direction of the drum, the cutting blade being displaceable in a radial direction from a position retracted inside the drum to a position at least partially extended through the vertical slit outside the side surface of the drum, a fixed cam relative to which the drum rotates and that is configured to press against the cutting blade so as to cause the cutting blade to extend out in a predefined angular position, and a seat that extends in the vertical direction (Z-Z) and is connected to the cam and which is suitable for engagement with a corresponding fixed reference pin in order to determine a predefined angular position of the cam, wherein the drum is configured to retain the strip against the side surface of the drum.

Implementations of the invention can provide one or more of the following features. The side surface of the drum defines a plurality of holes, and the drum further includes a plurality of channels that connect the plurality of holes to a suction device such that air is sucked in towards the inside of the drum thereby retaining the strip. The cam is mounted inside the drum. The cam is of the double track type suitable for pushing/recalling the blade. The drum further includes a spring configured to recall the blade into the retracted position. The drum further includes a plurality of cutting blades arranged at a predefined constant angular distance. The side surface has at least one buffer element made of resilient material and arranged downstream of each blade and is able to come into contact with the surface of the container substantially at the moment of impact with the label. The drum further includes at least one reference notch suitable for being detected by a fixed sensor for determination of a start-of-cycle position of the drum.

In general, in another aspect, embodiments of the invention can provide an apparatus for applying linerless labels from a continuous strip onto a container movable with a given trajectory and speed on a machine comprising at least one drum, as described herein, for cutting and transferring the labels.

Implementations of the invention can provide one or more of the following features. The apparatus according further includes a first unit for unwinding the continuous strip of labels and a second unit for driving the strip, the first and second units are arranged in series with each other and upstream of the drum. The first unit for unwinding the strip includes a vertical-axis reel on which the strip is wound, a plurality of transmission rollers, at least one jockey roller for tensioning the strip, and a motor for rotationally actuating the reel. The second unit driving the strip includes a vertical-axis cylinder associated with a roller to which it is connected via belts angularly arranged so as to produce a tangential orientation of the strip leaving the drive unit relative to the transfer drum, a motor for rotationally actuating the cylinder, and a sensor arranged tangentially with respect to the drive cylinder for detecting reference marks printed on the strip. The drive cylinder is associated with jets of air supplied to the annular grooves of the drive cylinder and designed to press the strip against the drum. The drive cylinder is rotationally actuated in a discontinuous start/stop sequence. The drive cylinder is rotationally actuated in a continuous manner at a variable speed. The strip moves in synchronism with the drum and the product. The side surface of the drum has at least one buffer element made of resilient material and arranged downstream of each blade and able to come into contact with the surface of the container at the moment of impact with the label. The drum rotates synchronized in terms of its position and with a tangential speed, in the angular position of impact of the label with the container, equal to the tangential speed of the container itself. The drum rotates synchronized in terms of its position and with a speed equal to the speed of the machine. The drum rotates synchronized in terms of its position and with a speed which is different from the speed of the machine, wherein the speed is variable with acceleration/deceleration ramps. The drum rotates synchronized in terms of its position and with a speed which is different from the speed of the machine, namely in start/stop manner with acceleration/deceleration ramps. The drum rotates with a speed of rotation equal to the sum of the speed of the machine and a predefined speed of rotation of the container about its vertical axis. The drum has a plurality of cutting blades arranged in an angular position defined by the geometrical configuration of the labeling machine. The apparatus according further includes an air suction device in communication with a plurality of holes defined in the side surface. The apparatus is mounted on a support base.

In general, in yet another aspect, embodiments of the invention can provide a method for cutting linerless labels from a continuous strip and transferring the labels to a container movable with a given trajectory and speed on a container-conveying machine, the method including providing a drum, as described herein, rotating synchronized in terms of its position and with a tangential speed equal to the tangential speed of the container itself at the angular position of impact of the label with the container, feeding a strip of linerless labels to the drum with start/stop mode advancing of the strip, retaining the strip of labels with relative contact between the side surface of the drum and the non-adhesive side of the labels, sending, by the container-conveying machine, a consent signal indicating the presence of a container at a predefined distance from the angular position of impact with the label, synchronizing the advancing of the strip so as to position the first label at the point of impact with the container, impacting the label and the container, extending the cutting blade from the drum, tensioning of the strip by the container, separating the label from the strip, and completing adhesion of the label on the container.

Various aspects of the invention may provide one or more of the following capabilities. An apparatus for the application of linerless labels onto moving containers, which is able to solve the technical problems mentioned above can be provided. A device having small dimensions can be provided. A device that is easy and inexpensive to produce and assemble and is able to be installed easily on pre-existing machines, without the need for excessive special adaptation, can be provided. A drum for cutting linerless labels from a continuous strip and transferring them onto a container movable with a given path and speed on a labeling machine can be provided.

These and other capabilities of the invention, along with the invention itself, will be more fully understood after a review of the following figures, detailed description, and claims.

DETAILED DESCRIPTION

Embodiments of the invention provide techniques for providing a drum for cutting and transferring linerless labels from a continuous strip to a moving container and an apparatus for applying linerless labels to moving containers, provided with said drum. Other embodiments are within the scope of the invention.

Figure 1:
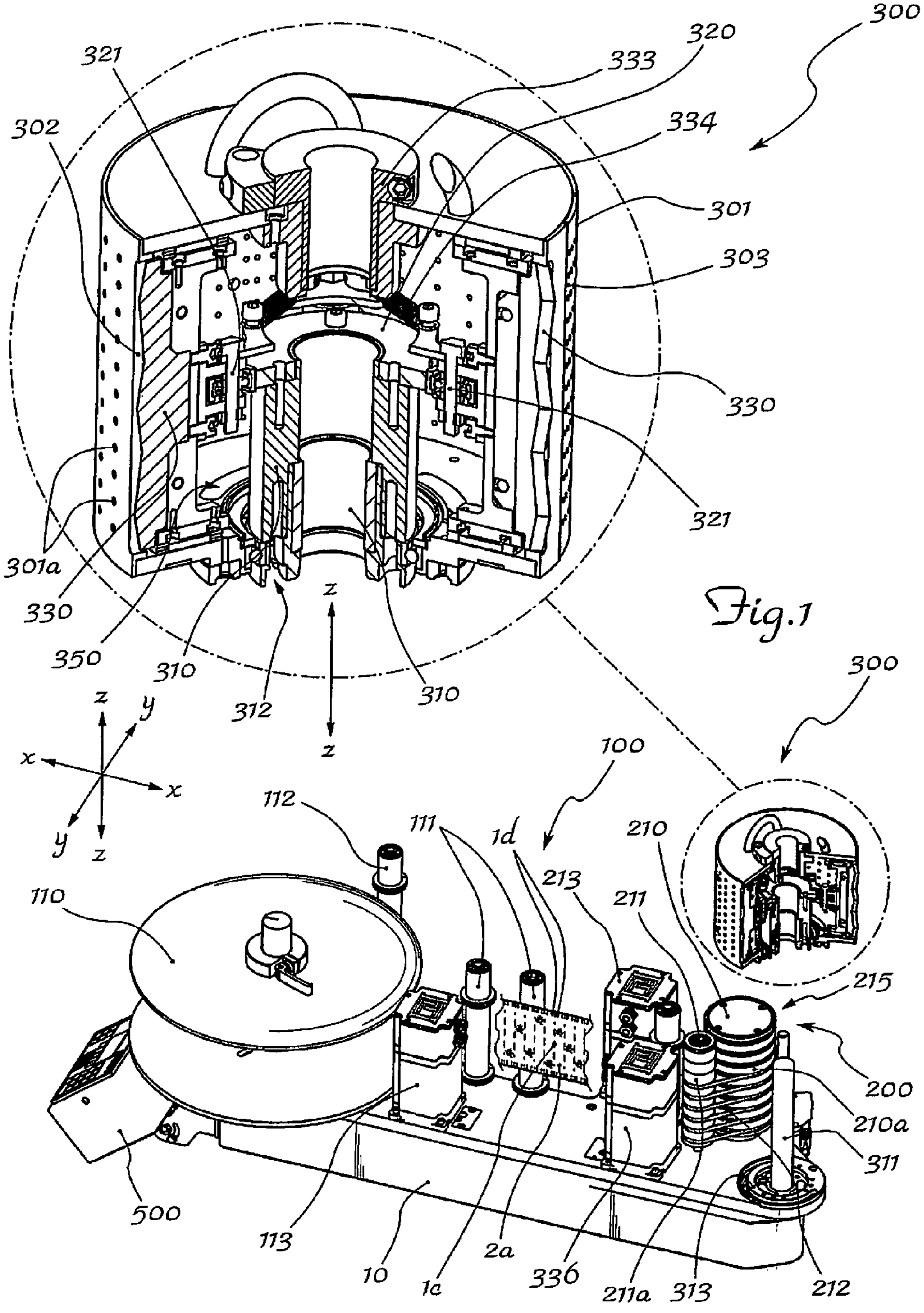
FIG. 1 shows a partially exploded perspective view of an apparatus with the cutting and transfer drum partly sectioned.
Figure 2:
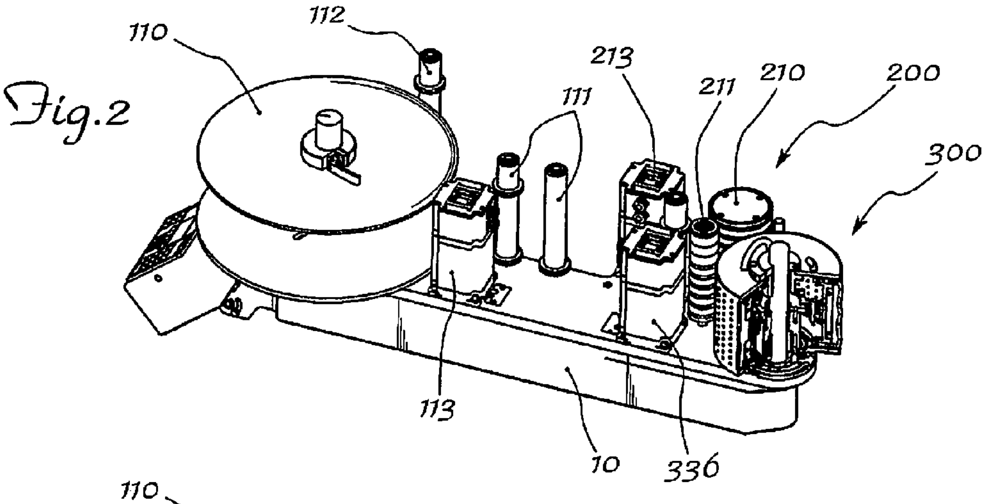
FIG. 2 shows a perspective view of the apparatus of FIG. 1 with the cutting and transfer drum mounted.
Figure 3:
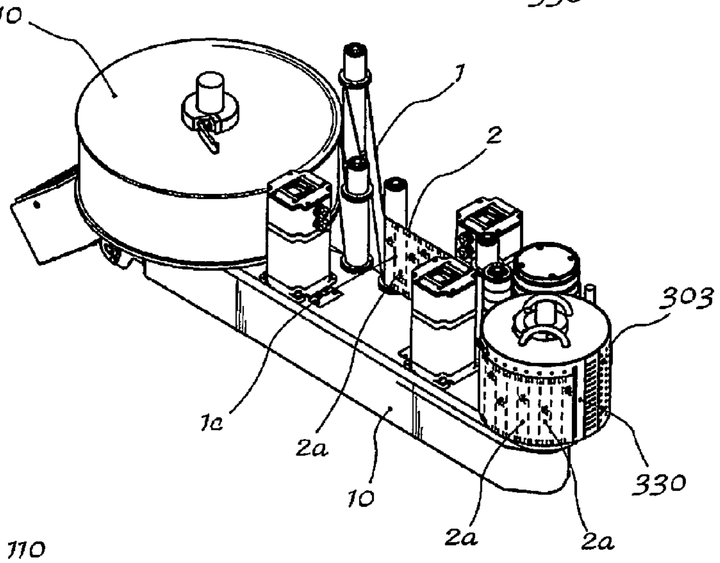
FIG. 3 shows a perspective view of the apparatus shown in FIG. 2.
Figure 4:
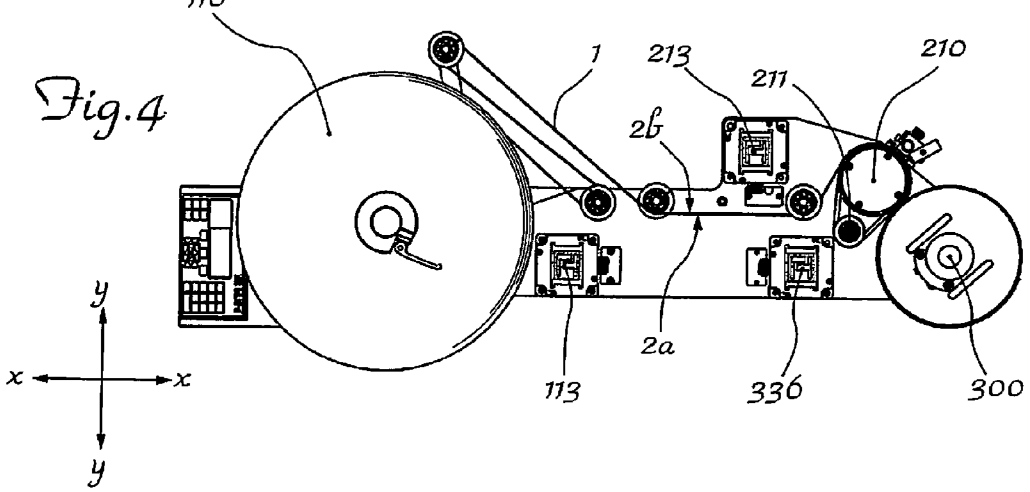
FIG. 4 shows a top plan view of the apparatus according to FIG. 2.

As shown in FIG. 1 and FIG. 4, and assuming solely for the sake of convenience of description and without any limitation of meaning a set of three reference axes in a longitudinal direction X-X, corresponding to the direction of extension of a continuous strip of linerless labels, transverse direction Y-Y, and vertical direction Z-Z, respectively, as well as a front side corresponding to the side where the label leaves the apparatus and a rear side opposite to the front side.

The apparatus preferably includes a unit 100 for unwinding a continuous strip 1 of labels 2 of the linerless type with a rear adhesive surface 2*a* and a front non-adhesive surface 2*b*. The strip also preferably has perforations (pre-cuts) 1*c* extending parallel to the vertical direction Z-Z and arranged at constant intervals along the longitudinal extension of the strip 1 so as to separate the individual labels 2 and form pre-weakened cutting lines. The strip 1 can also be provided with printed reference marks 1*d* as shown in the example of FIG. 1, on either side of the pre-weakened cutting line. The reference marks can be, for example, suitable for being detected by a sensor as will be descried more clearly in the description below.

Figure 5:
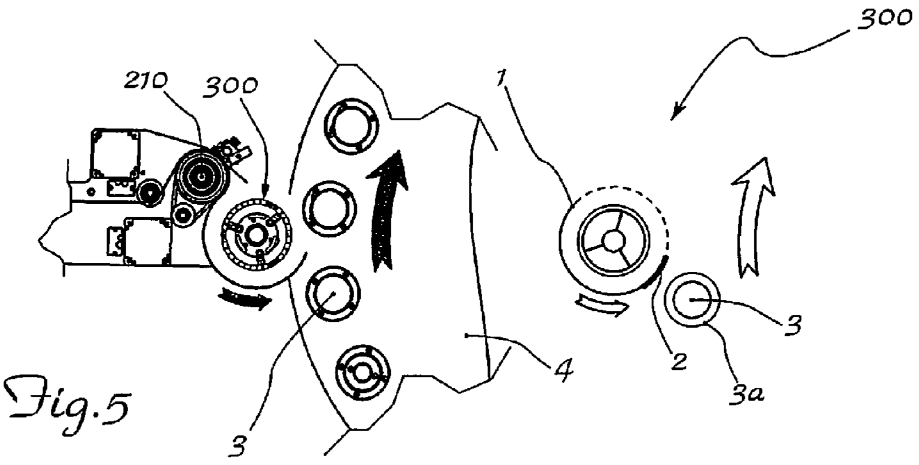
FIGS. 5-7 show partial views, from above, of the apparatus during various operating stages.
Figure 6:
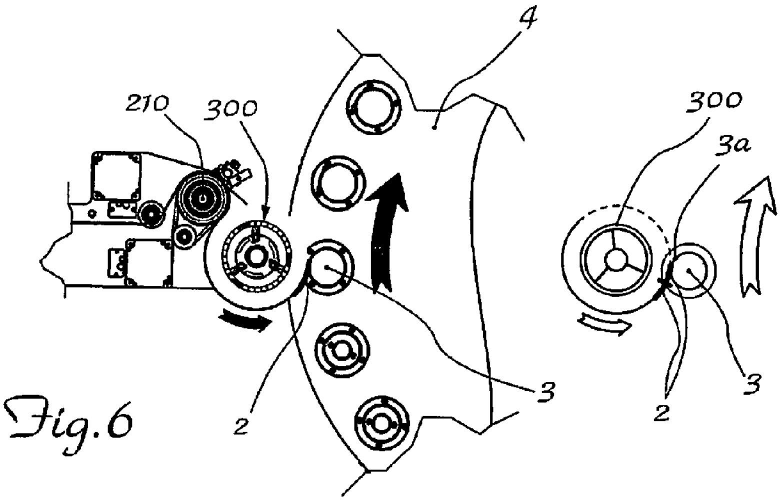
Figure 7:
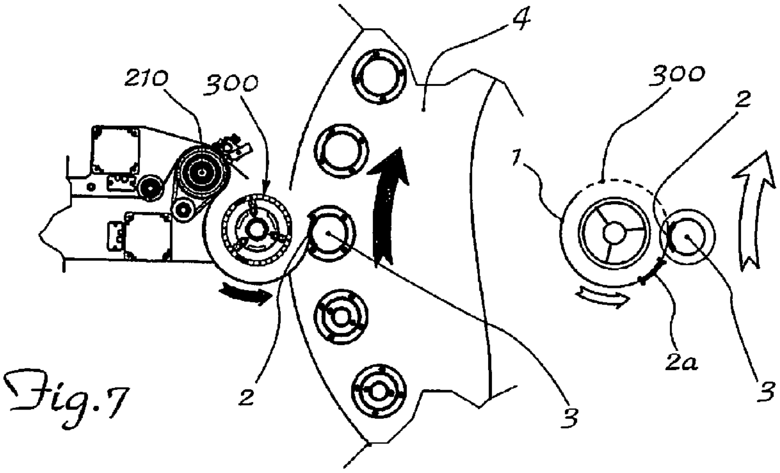

The apparatus preferably also includes a unit 200 for driving the strip 1, a drum 300 for cutting and transferring the individual labels 2 onto the respective container 3 (e.g., as shown in FIG. 5) which travels along a given path on a machine 4, which may be equally well of the rotating type (e.g., as shown) or linear type, and on which a surface 3*a* for application of a label is provided.

In greater detail, the unit 100 for unwinding the strip 1 preferably comprises a vertical-axis reel 110 onto which the strip 1 is wound, a plurality of transmission rollers 111, and at least one jockey roller 112 for tensioning the strip during unwinding thereof. The unit 100 also preferably includes a motor 113 for driving the reel, via which it is possible to maintain the correct tension of the strip 1 during unwinding thereof.

The unit 200 for driving the strip 1 preferably comprises a vertical-axis cylinder 210 associated with a roller 211 to which it is connected by means of belts 212 which are housed inside associated annular grooves 210*a* and 211*a* on the cylinder 210 and the roller 211, respectively. The belts 212 preferably assume an angular position such as to determine a tangential orientation of the strip 1 leaving the drive unit relative to the label transfer drum 300 described below. The unit 200 also preferably includes a motor 213 for rotationally actuating the cylinder 210 with start/stop operation, and a photocell 215 arranged tangentially with respect to the drive cylinder 210 for detecting reference marks 1*d* printed on the strip.

The label transfer and cutting drum 300 preferably comprises an outer side surface 301 provided with through-holes 301*a* and a first coaxial and concentric sleeve 310 for centering the drum on an associated spindle 311 supporting the said drum. Both the sleeve 310 and the spindle 311 can have a cylindrical or grooved engaging surface. In its bottom part, according to the layout shown in FIG. 1, the first sleeve 310 can have at least one seat 312 extending in the vertical direction Z-Z and suitable for engagement with a corresponding fixed reference pin 313 so that the pin/seat connection determines predefined angular positioning of a cam 320 which is fixed with respect to the drum 310 which rotates coaxially relative thereto.

In the example shown in FIG. 1 the cam 320 can be arranged on the top front surface 312*a* of the first sleeve 310 and have a pressing surface 320*a* able to act by means of special connection elements 321 (conventional per se and therefore not described in detail) on at least one cutting blade 330 parallel to the vertical direction Z-Z and housed inside corresponding vertical slits 302 on the side surface 301 of the drum. Owing to the interaction with the cam 320, the blade 330 can be displaceable, in a radial direction, from a position retracted inside the drum into an extracted position outside the side surface of the drum. The angular position of the cam can therefore define the angular position for cutting the label in relation to the length, in the longitudinal direction X-X, of the label to be applied.

Springs 334 can be fastened at their first ends to the same cam/blade connection elements 321 and can be fixed at their other end (e.g., as shown in the example) to a second sleeve 333 for centering the drum, which can be coaxial with the first sleeve 310. The springs 334 preferably being able to recall the blade 330 into its retracted position.

Downstream of each blade 330, the side surface 301 of the drum 310 preferably has buffer elements 303 that are made of resilient material and are able to come into contact with the surface of the container in order to take up any excess play in the transverse dimensions of the container. The inside of the drum can also be provided with channels 350 which can be connected to corresponding suction means (not shown) for creating the vacuum on the surface 301 of the drum. The drum can have associated with it, via the spindle 311, a corresponding motor 336 that is able to keep the drum itself rotating constantly about the cam 320.

In a preferred embodiment, it is envisaged that the apparatus is associated with a device 500 for programming and controlling the motors, the various detection sensors and the corresponding operating sequences. For example, the device 500 can be a conventional computer.

It is also envisaged that the device 500 can be connected to a fixed sensor (not shown) for detecting a reference notch on the drum 300 in order to determine the angular position of the latter and be able to bring it into the correct position for synchronization with the product to be labeled. During application of the label, feeding of the strip 1 will preferably also be synchronized with the product to be labeled so that extraction of the blade, which preferably always occurs in the same angular position upon operation of the fixed cam, corresponds to the passing movement of the pre-cut line 1*c* in front of the said angular position where extraction of the blade occurs.

All the parts described above are preferably mounted on a single support 10.

With this structure the operating principle of the apparatus can be as follows. The drum 300 can be prepared so as to correspond to the height of the label 2 in the direction Z-Z and its length in the direction X-X. The apparatus can be installed opposite the machine 4 for moving the container 3 so that, at the point of application of the label 2, the side surface 301 of the drum is tangential to the surface 3*a* of the moving container (shown rotating in the illustrative example) along a predefined path on a labeling machine 4. The strip 1 can be manually prepared by unwinding it from the reel 110 until the first label is situated opposite the sensor 215 of the drive cylinder 210. The control unit 500 can be used to set, as main parameters, the length of the label 2 in the longitudinal direction X-X and the speed of rotation of the drum 300 so as to correspond to the speed of the machine 4. In this case, the blade interval of the drum can be equivalent to the product interval on the machine. The drive motor 213 can be operated manually so that the strip 1 advances along its path around the drive cylinder 210, causing reversal of the opposite surfaces 2*a*, 2*b* of the label 2 which reaches the drum 300 with its non-adhesive surface 2*a* directed towards the side surface 301 of the drum and adhesive surface 2*b* directed outwards. In this way, continuing its feeding movement, the strip 1 can be removed from the drum 300 retaining it by means of suction via the holes 301*a*.

Then, when the labeling machine 4 starts to rotate about its axis, the control unit 500 can cause rotation of the drum 300, synchronizing the movement of the latter with the speed and the position of the product 3 to be labeled. In this way the contact surfaces of the drum and the product 3 to be labeled can have the same tangential speed and arrive correctly and synchronized at the impact point. Preferably, when the container 3 is close to the labeling position, the labeling machine 4 can send a consent signal to the control unit 500 of the apparatus that can operate the drive 200 so as to feed the strip 1 until it reaches the speed of the product to be labeled. During synchronized feeding of the strip 1 the first front label 2 can be situated at the point of impact with the container 3 to which it starts to adhere and from which it starts to be removed in synchronism. In this instant, the container 3, the drum 300, and the strip 1 preferably have the same speed.

Simultaneously, the cam 320 preferably causes extraction/extension of the blade 330, which in that moment passes the angular position opposite that the pre-weakened perforated line 1*c* of the strip 1 also passes. Consequently, the container, which continues its movement along its path, draws along with it the label 2 and the latter is cut and separated easily and in a reliable manner from the strip 1 opposite the blade 330 only after adhering to the product. In this way, the label can adhere completely to the container, optionally being assisted by a smoothing device (not shown).

Subsequently, the sensor 215 of the drive cylinder can detect the reference notch 1*d* on the strip 1, causing stoppage of the drive unit 220, which also stops the strip, preparing it so that it is ready to start for the next application, while the drum 300 continues its rotational movement with a speed and position synchronized with that of the machine 4. Continuing its rotation, the drum can cause rotation of the element 321 which, continuing to adhere to the cam 320, allows the blade 330 to be recalled inside the drum by the action of the springs 334, being prepared for the next cut.

One exemplary method is therefore described how the drum for cutting and transferring linerless labels and an associated apparatus provided with the drum are able to provide a solution to the technical problems of the prior art, allowing flexible and thin labels to be applied at a high speed since the labels are held on the drum by means of their non-adhesive surface, ensuring precise and square positioning and safe and repeatable separation at the moment of impact with the container.

Figure 8:
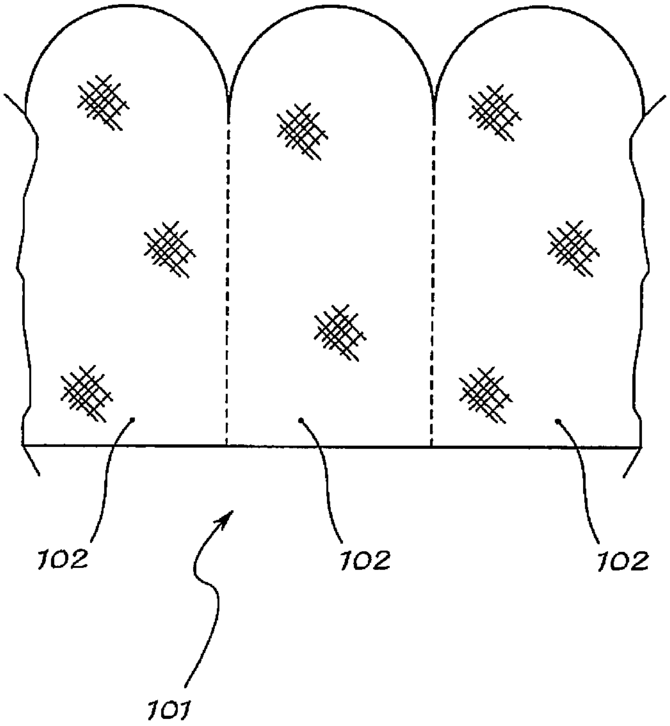
FIG. 8, shows a front view of a further example of a label that can be applied by means of the apparatus.

In addition to the above, with the apparatus described herein, it is possible to apply in a fast, safe and repeatable manner also shaped linerless labels 102 of the type shown in FIG. 8, in strip form 101, application of which is at present considered to be extremely problematic.

With the drum 300 as described changing of the format may also be performed in an extremely quick and easy manner since it is possible to provide a cutting and transfer drum for each series of homogeneous labels. The drum being replaced when there is a variation in the type of label, thereby reducing the downtime of the apparatus and therefore of the labeling machine.

A number of variations of embodiments of the apparatus are also envisaged. For example, the drum 300 can rotate at a speed different from that of the machine, namely continuously with a variable speed comprising acceleration/deceleration ramps for recovering any difference between the angular distance of the blades and the interval of the products to be labeled. The drum 300 can rotate at a speed different from that of the machine and in a discontinuous start/stop manner with acceleration/deceleration ramps. The speed of rotation of the drum 300 can be equal to the speed of rotation of the machine plus the speed of rotation of the container about its vertical axis, allowing the application of labels that are longer in the longitudinal direction onto containers that are larger without any variation in the advancing speed of the machine 4. The drum can have a plurality of cutting blades 330 which are arranged in an angular position defined by the geometrical configuration of the labeling machine (e.g., pitch diameter and number of container-support discs 3) so that cutting occurs several times during each complete rotation of the drum. The blade extraction cam 320 can be provided with a double track so that it is possible to perform both extraction and retraction of the blade 330. Air jets can be supplied to the annular grooves 212*a* of the drive cylinder 210 so as to push the strip 1 against the drum 30 for equivalent transfer of the strip 1 from the drive cylinder 210 onto the drum 300. The drive cylinder 210 can be rotationally driven continuously at a variable speed so as to reduce downtime.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. An apparatus for applying linerless labels from a continuous strip onto a container movable with a given trajectory and speed on a container-conveying machine comprising:

at least one drum adapted to cut and transfer the labels to the container;

a first unit for unwinding the continuous strip of labels; and a second unit for driving the continuous strip of labels and reversing an opposite surface of each of the labels before each label contacts the drum, the first and second units arranged in series with each other and upstream of the drum;

wherein the at least one drum is adapted to cut each label after its impact with the container while the continuous strip of labels is under tension by the container.

2. An apparatus according to claim 1, wherein the first unit for unwinding the strip comprises:

a vertical-axis reel on which the strip is wound, a plurality of transmission rollers, at least one jockey roller for tensioning the strip; and a motor for rotationally actuating the reel.

3. An apparatus according to claim 1, wherein the second unit driving the strip comprises:

a vertical-axis cylinder associated with a roller to which it is connected via belts angularly arranged so as to produce a tangential orientation of the strip leaving the drive unit relative to the transfer drum;

a motor for rotationally actuating the cylinder; and a sensor arranged tangentially with respect to the drive cylinder for detecting reference marks printed on the strip.

4. An apparatus according to claim 3, wherein the drive cylinder is associated with jets of air supplied to annular grooves of the drive cylinder and designed to press the strip against the drum.

5. An apparatus according to claim 1, wherein the second unit includes a drive cylinder rotationally actuated in a discontinuous start/stop sequence.

6. An apparatus according to claim 1, wherein the second unit includes a drive cylinder rotationally actuated in a continuous manner at a variable speed.

7. An apparatus according to claim 1, wherein the strip moves in synchronism with the drum and the container.

8. An apparatus according to claim 1, wherein the side surface of the drum has at least one buffer element made of resilient material and arranged downstream of each blade and able to come into contact with the surface of the container at the moment of impact with the label.

9. An apparatus according to claim 1, wherein the drum is adapted to rotate synchronized in terms of its position and with a tangential speed, in the angular position of impact of the label with the container, equal to the tangential speed of the container itself.

10. An apparatus according to claim 1, wherein the drum is adapted to rotate synchronized in terms of its position and with a speed equal to the speed of the machine.

11. An apparatus according to claim 1, wherein the drum is adapted to rotate synchronized in terms of its position and with a speed which is different from the speed of the machine, wherein the speed is variable with acceleration/deceleration ramps.

12. An apparatus according to claim 1, wherein the drum is adapted to rotate synchronized in terms of its position and with a speed which is different from the speed of the machine, namely in start/stop manner with acceleration/deceleration ramps.

13. An apparatus according to claim 1, wherein the drum is adapted to rotate with a speed of rotation equal to the sum of the speed of the machine and a predefined speed of rotation of the container about its vertical axis.

14. An apparatus according to claim 1, wherein the drum has a plurality of cutting blades arranged in an angular position defined by the geometrical configuration of the labeling machine.

15. An apparatus according to claim 1, further comprising an air suction device in communication with a plurality of holes defined in the side surface.

16. An apparatus according to claim 1, wherein the apparatus is mounted on a support base.

17. A method for cutting linerless labels from a continuous strip and transferring the labels to a container movable with a given trajectory and speed on a container-conveying machine, the method comprising:

providing a drum for cutting and transferring the labels to the container, rotating synchronized in terms of its position and with a tangential speed equal to the tangential speed of the container itself at the angular position of impact of the label with the container;

feeding a strip of linerless labels to the drum through a first unit for unwinding the continuous strip of labels and a second unit for driving the continuous strip and reversing the opposite surfaces of the labels with start/stop mode advancing of the strip, the first and second units arranged in series with each other and upstream the drum;

retaining the strip of labels with relative contact between the side surface of the drum and the non-adhesive side of the labels;

sending, by the container-conveying machine, a consent signal indicating the presence of a container at a predefined distance from the angular position of impact with the label;

synchronizing the advancing of the strip so as to position the first label at the point of impact with the container;

impacting the label and the container;

extending the cutting blade from the drum;

tensioning of the strip by the container;

separating the label from the strip after the label has impacted the container and while the strip is under tension by the container; and completing adhesion of the label on the container.

18. The method of claim 17, wherein the second unit produces a tangential orientation of the strip leaving the second unit relative to the drum.

19. The method of claim 18, wherein the second unit includes a drive cylinder rotationally actuated in a discontinuous start/stop sequence.

20. The method of claim 17, wherein the second unit includes a drive cylinder rotationally actuated in a continuous manner at a variable speed.

21. The method of claim 17, wherein the strip moves in synchronism with the drum and the container.

22. The method of claim 17, wherein a side surface of the drum has at least one buffer element made of resilient material, arranged downstream of each blade, and able to come into contact with the surface of the container at the moment of impact with the label.

23. The method of claim 17, wherein the drum rotates synchronized in terms of its position and with a tangential speed, in the angular position of impact of the label with the container, equal to the tangential speed of the container itself.

24. The method of claim 17, wherein the drum rotates synchronized in terms of its position and with a speed equal to the speed of the machine.

25. The method of claim 17, wherein the drum rotates synchronized in terms of its position and with a speed which is different from the speed of the machine, wherein the speed is variable with acceleration/deceleration ramps.

26. The method of claim 17, wherein the drum rotates synchronized in terms of its position and with a speed which is different from the speed of the machine, namely in start/stop manner with acceleration/deceleration ramps.

27. The method of claim 17, wherein the drum rotates with a speed of rotation equal to the sum of the speed of the machine and a predefined speed of rotation of the container about its vertical axis.

28. The method of claim 17, further comprising providing a suction means such that air is sucked in towards an inside of the drum thereby retaining the labels on a side surface of the drum.

29. The apparatus of claim 1, wherein the at least one drum cuts the labels after their adhesion to the container.

* * * * *